United States Patent
Shabino et al.

(10) Patent No.: US 7,184,924 B1
(45) Date of Patent: Feb. 27, 2007

(54) METHOD, APPARATUS AND COMPUTER PROGRAM PRODUCT FOR IMPLEMENTING THERMAL INTEGRITY SCREENING

(75) Inventors: Peter James Shabino, Rochester, MN (US); Terrance Wayne Kueper, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/266,745

(22) Filed: Nov. 3, 2005

(51) Int. Cl.
*G01K 17/00* (2006.01)
*G06F 15/00* (2006.01)

(52) U.S. Cl. ........................ 702/130; 702/136
(58) Field of Classification Search .................. 702/85, 702/99, 117–119, 130–134, 136; 374/5, 374/47; 713/320; 324/106, 127
See application file for complete search history.

(56) References Cited

U.S. PATENT DOCUMENTS

2004/0128101 A1* 7/2004 Hermerding ................ 702/136

* cited by examiner

Primary Examiner—John Barlow
Assistant Examiner—John Le
(74) Attorney, Agent, or Firm—Joan Pennington

(57) ABSTRACT

A method, apparatus and computer program product are provided for implementing thermal integrity screening. Predefined processor module temperature data are obtained and processed. An initial thermal calibration is performed to record a predefined processor resistance with no power applied to the processor module. A limit check is performed at power up to detect and compare a thermal bond operating temperature with an identified threshold temperature for the processor module. Responsive to an identified thermal bond operating temperature greater than the identified threshold temperature, the processor module is shutdown and the processor module failed.

16 Claims, 8 Drawing Sheets

METHOD, APPARATUS AND COMPUTER PROGRAM PRODUCT FOR IMPLEMENTING THERMAL INTEGRITY SCREENING

FIELD OF THE INVENTION

The present invention relates generally to the data processing field, and more particularly, relates to a method, apparatus and computer program product for implementing thermal integrity screening.

DESCRIPTION OF THE RELATED ART

To provide improved reliability, a need exists for an effective mechanism for testing processor modules. It is highly desirable to provide an effective mechanism to verify the thermal integrity of a heatsink to a processor module gap.

Conventionally, the only way to verify the thermal integrity of the heatsink to the processor module gap has required manual measurements and calculations.

SUMMARY OF THE INVENTION

Principal aspects of the present invention are to provide a method, apparatus and computer program product for implementing thermal integrity screening of a processor module. Other important aspects of the present invention are to provide such a method, apparatus and computer program product for implementing thermal integrity screening substantially without negative effect and that overcome many of the disadvantages of prior art arrangements.

In brief, a method, apparatus and computer program product are provided for implementing thermal integrity screening of a processor module. Predefined processor module temperature data are obtained and processed. An initial thermal calibration is performed to record a predefined processor resistance with no power applied to the processor module. A limit check is performed at power up to detect and compare a thermal bond operating temperature with an identified threshold temperature for the processor module. Responsive to an identified thermal bond operating temperature greater than the identified threshold temperature, the processor module is shutdown and the processor module failed.

In accordance with features of the invention, a gap check is performed using processed module temperature data and parametric data for the processor to determine that the thermal gap is correct. To obtain the parametric data for the processor an electronic chip identification (ECID) for the processor is identified. Also the gap check verifies that a correct processor module is attached to a printed circuit card.

In accordance with features of the invention, a data acquisition unit is coupled to the processor module to measure a module supply voltage and an on-die thermal value. An on-die thermistor or thermal diode is provided with the processor chip. An intake air temperature sensor, such as a thermistor in the incoming cooling air path to measure intake air temperature, is coupled to the data acquisition unit. The electronic chip identification (ECID) is read from the processor and is used to obtain a chip manufacturer record. Predefined constants for specific printed circuit board processor module assembly are automatically selected at runtime to verify that the correct processor module is attached to the printed circuit card and that the thermal gap is correct.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method is provided that automates the process of thermal integrity screening of a heatsink to processor module gap. This allows push button testing of the thermal gap for multiple different processor module systems by operators with little or no training.

In accordance with features of the invention, a limit check is done before an electronic chip identification (ECID) of the processor is identified. The limit check uses generic constants to verify that the processor is not hot enough to damage itself, for example, less than 115 C but since the calculations are generic and intentionally approximate the limit check is not used to verify the long-term thermal stability of the gap. The limit check provides a gross fire check so that when the processor gets hot on power up, for example when there is chance of fire, the processor module system is shut down right away.

In accordance with features of the invention, a gap check is done once the ECID is known. The ECID is used to get thermal integrity (TI) data specific to the processor module under test. With this specific data the gap check is performed to verify the integrity of the bond with, for example, 100 times better accuracy than using the limit check method. If the ECID data were known before power up of the processor module under test, the limit check could be eliminated. But since power up of the processor module system under test is needed to read the ECID, the limit check advantageously is used to identify a majority of misassembled parts before damage occurs.

Figure 1:
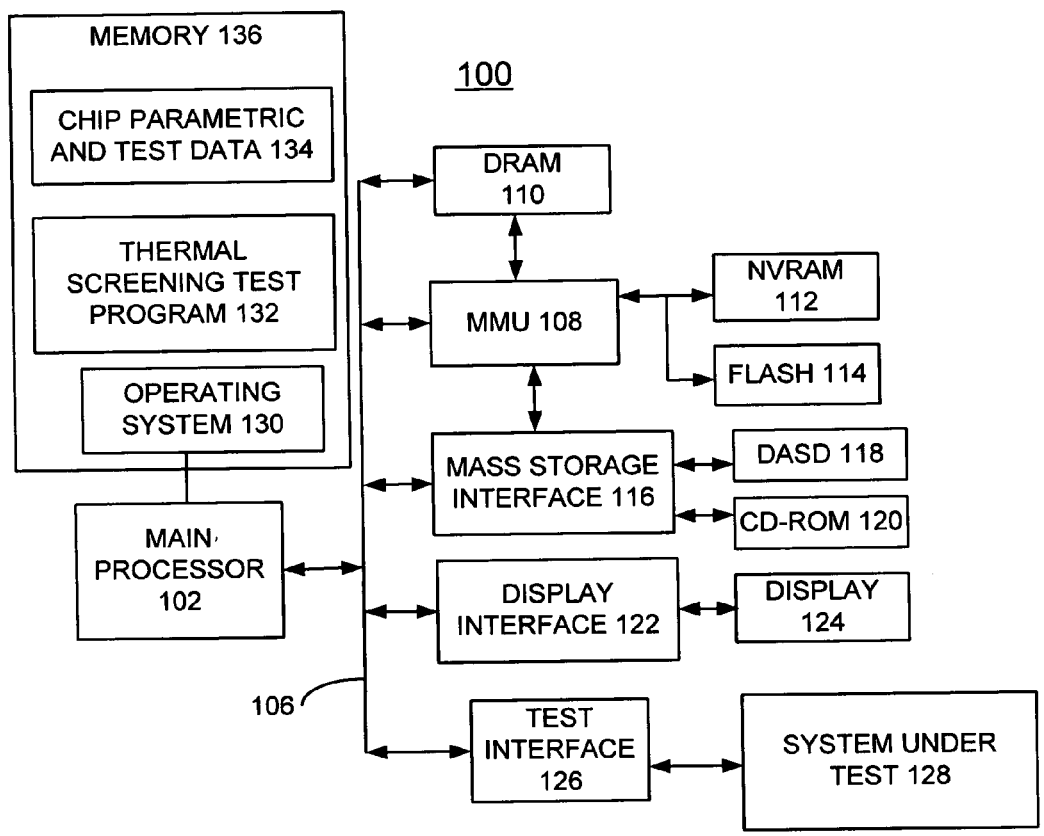
FIG. 1 is a block diagram representation illustrating an exemplary computer test system for implementing thermal integrity screening in accordance with the preferred embodiment.

Referring now to the drawings, in FIG. 1 there is shown an exemplary computer test system generally designated by the reference character 100 for implementing thermal integrity screening in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a test interface 126 coupled to the system bus 106. A system under test 128 is coupled to the test interface 126. The system under test 128 includes, for example, a single chip module (SCM), a dual chip module (DCM) or a quad chip module (QCM). Computer system 100 includes an operating system 130, a thermal screening test program 132 of the preferred embodiment, and chip parametric and test data 134 of the preferred embodiment resident in a memory 136.

Computer test system 100 is shown in simplified form sufficient for understanding the present invention. The illustrated computer test system 100 is not intended to imply architectural or functional limitations. The present invention can be used with various hardware implementations and systems and various other internal hardware devices, for example, multiple main processors.

Figure 2:
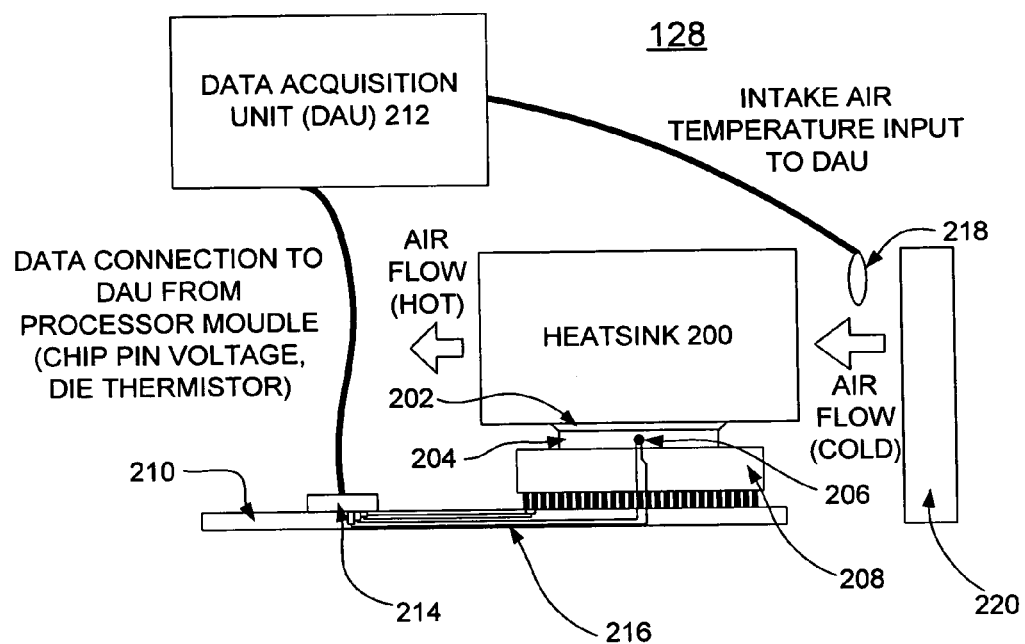
FIG. 2 is a block diagram representation illustrating an exemplary system under test apparatus for implementing thermal integrity screening in accordance with the preferred embodiment.

Referring now to FIG. 2, there is shown an exemplary system under test 128 including apparatus for implementing thermal integrity screening in accordance with the preferred embodiment. Test system 128 includes a heatsink 200 coupled by a bond material 202 to a processor chip 204. An on-die temperature sensor 206, such as an on-die thermistor or thermal diode, is provided with the processor chip 204. The processor module includes a substrate 208 supporting the processor chip 204 mounted on a printed circuit board 210. A data acquisition unit 212 is coupled to the processor module via a connector 214 to obtain predefined measured processor module data, such as a module supply voltage, and the on-die thermal value. To obtain other specific printed circuit board processor module data, the electronic chip identification (ECID) is read from the processor or processors 204 during system boot and information can be derived from a database, which is indexed by ECID.

For example, a plurality of General Purpose Interface Bus (GPIB) channels or connections 216 is provided via connector 214 to each processor chip 204 for a single chip module (SCM), a dual chip module (DCM) or a quad chip module (QCM) to measure for example, the center thermistor resistance and a module rail voltage VDD. For the SCM or DCM, one thermistor 206 is provided per module. For the QCM, two thermistors 206 with a common terminal are provided per module. An intake air temperature sensor 218 measuring intake air temperature, such as a thermistor located in an incoming cooling air path from a system fan 220, is coupled to the data acquisition unit 212.

Referring now to FIGS. 3, 4, 5, 6A and 6B, there are shown exemplary steps of methods for implementing thermal integrity screening in accordance with the preferred embodiment.

Figure 3:
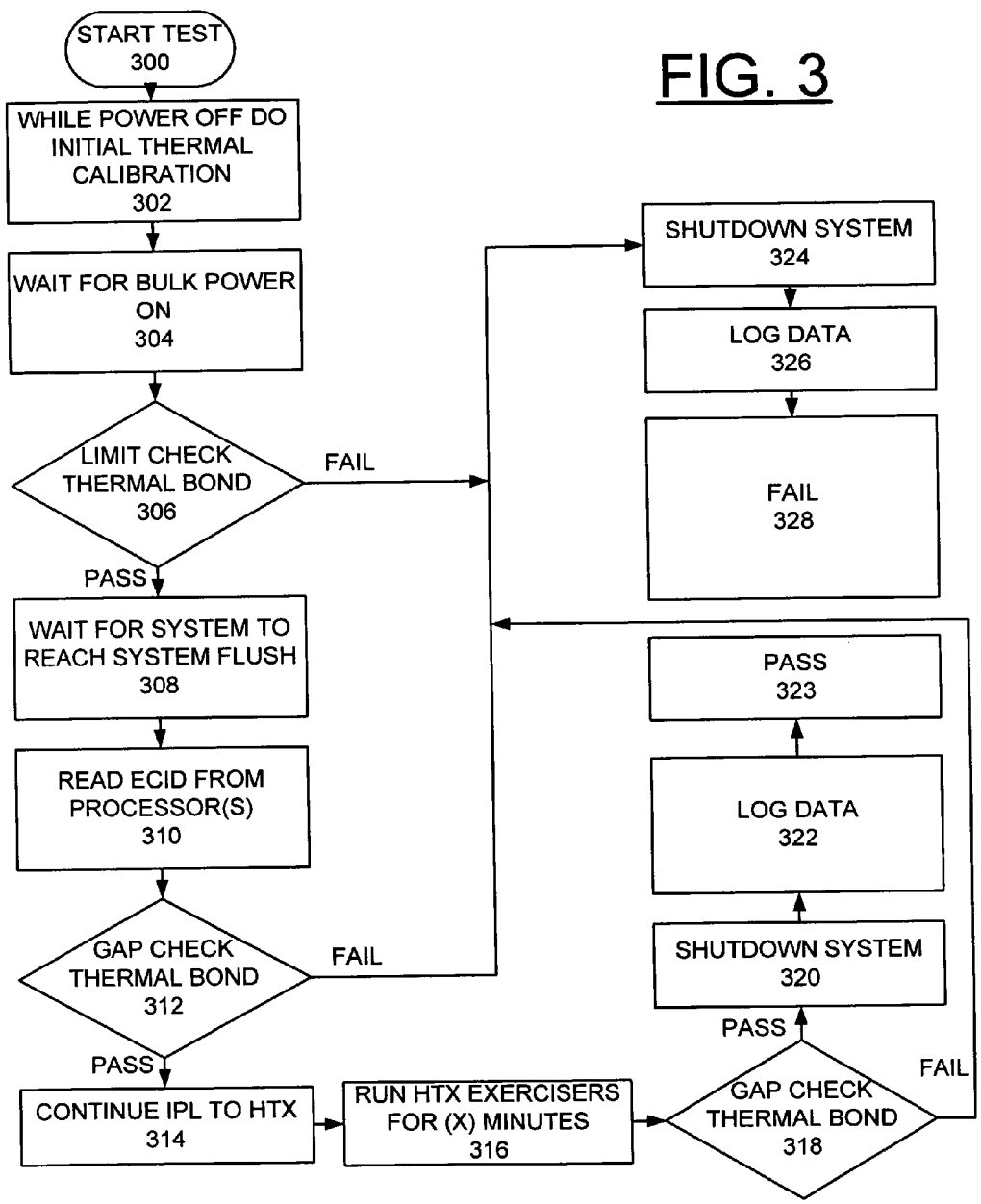
FIGS. 3, 4, 5, 6A and 6B are flow charts illustrating exemplary steps of methods for implementing thermal integrity screening in accordance with the preferred embodiment.

Referring to FIG. 3, there is shown an exemplary overview test flow as run by the test computer system 100 including unique steps of initial thermal calibration, limit check, gap check, and data logging steps starting at a block 300. As indicated in a block 302, while the power is off to the processor module under test, an initial thermal calibration is performed. An initial thermal calibration is illustrated and described with respect to FIG. 4. Then a delay minutes is provided as indicated in a block 304 until bulk power is turned on.

A limit check thermal bond is performed as indicated in a decision block 306. The limit check is illustrated and described with respect to FIG. 5. If the processor module passes the limit check, then a delay is provided to the system under test to reach a system flush as indicated in a block 308. Then the electronic chip identification (ECID) is read from the processor or processors 204 as indicated in a block 310.

Then the ECID is used to obtain a chip manufacturer record. Next a gap check thermal bond is performed as indicated in a decision block 312. If the processor module passes the gap check at decision block 312, then the initial program load (IPL) is continued to an exerciser HTX as indicated in a block 314.

Then the exerciser HTX are run for a set time period as indicated in a block 316. Then continuing the gap check thermal bond is performed as indicated in a decision block 318. The gap check is illustrated and described with respect to FIGS. 6A and 6B. If the processor module passes the gap check at decision block 318, then the system under test is shut down as indicated in a block 320, test data is logged as indicated in a block 322, and the pass result is returned as indicated in a block 323. Otherwise if the processor module fails the gap check at decision block 318, then the system under test is shut down as indicated in a block 324, test data is logged as indicated in a block 326, and the pass result is returned as indicated in a block 328. The test data logged at block 322 or block 324 includes, for example, the pass/fail result, test date, version formula, version constants GPIB address or channel, ECID or ECIDs, tester type, module type, processor type, TI field, VDD pins, chip thermistor resistance or resistances, and air thermistor resistance.

Figure 4:
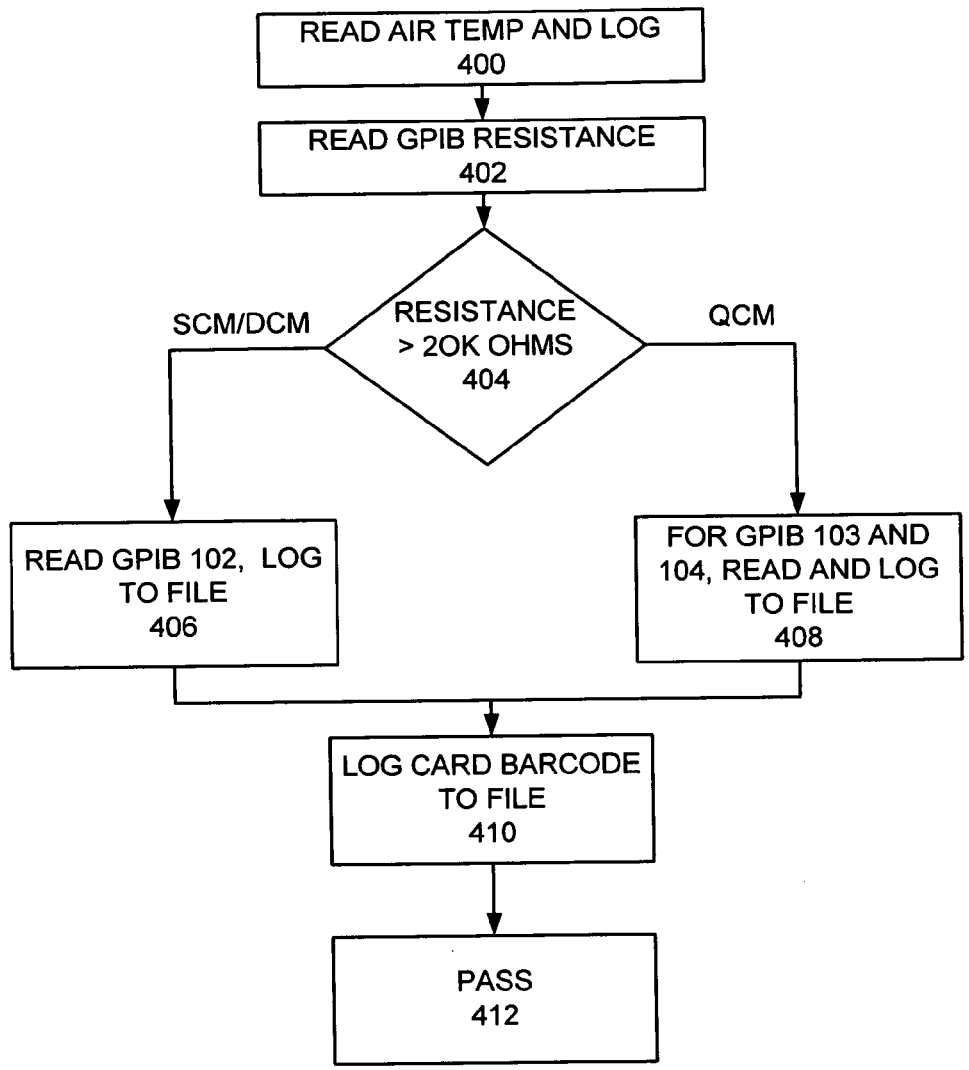

Referring to FIG. 4, there is shown an exemplary initial thermal calibration that begins with reading and logging air temperature as indicated in a block 400. Next a particular GPIB channel is read to check a resistance as indicated in a block 402. The resistance is compared with a predetermined value, such as 20K ohms as indicated in a decision block 404 to identify a module type. For the SCM or DCM, then as indicated in a block 406 a particular GPIB channel is read to measure and record the thermistor resistance of the chip core at room temperature to a file for use in later steps. For the QCM, as indicated in a block 408 a particular pair GPIB channels are read to measure and record the two thermistor resistance of the chip core at room temperature to a file for use in later steps. Then a barcode for the printed circuit card is stored to the file as indicated in a block 410. A pass is returned as indicated in a block 412.

Figure 5:
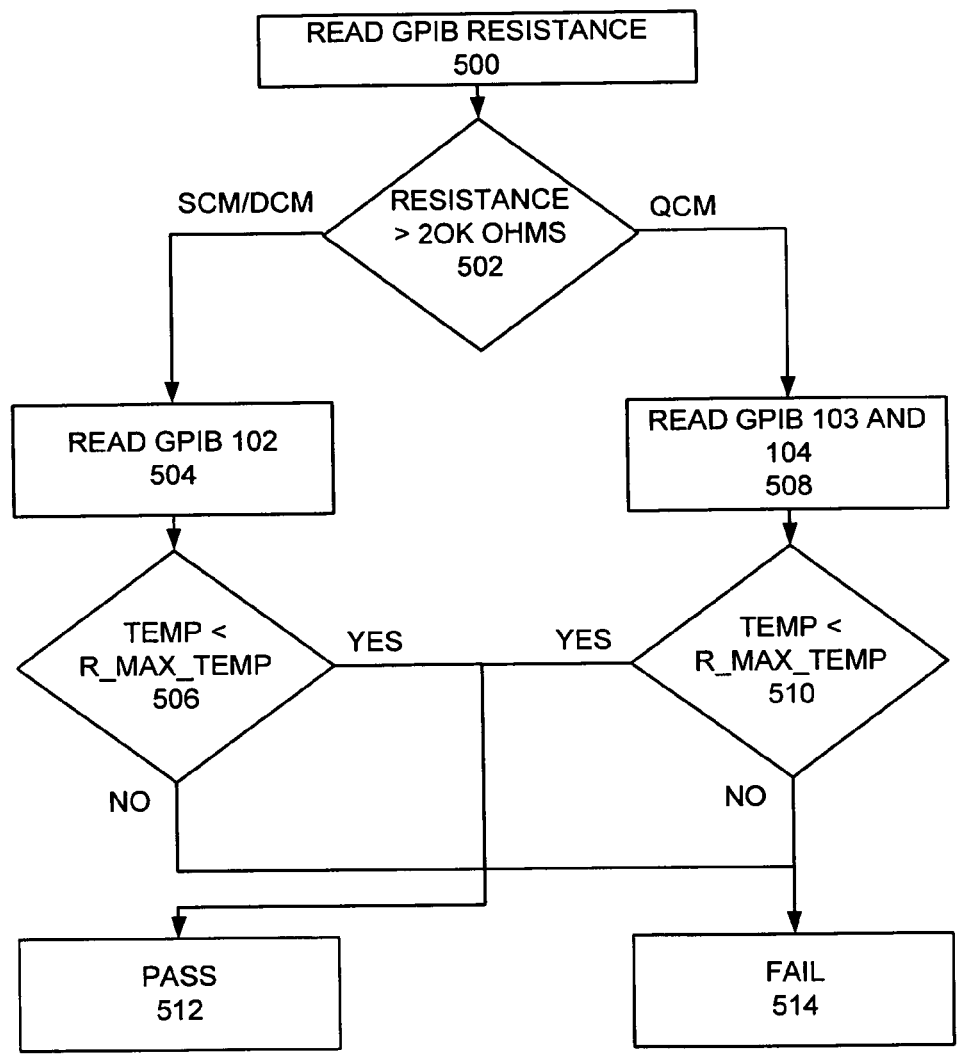

Referring to FIG. 5, there is shown an exemplary limit check performed after power up to detect and compare a thermal bond operating temperature with an identified threshold temperature for the processor module. First the particular GPIB channel is read to check a resistance as indicated in a block 500. The resistance is compared with a predetermined value, such as 20K ohms as indicated in a decision block 502 to identify the module type. For the SCM or DCM, then as indicated in a block 504 a particular GPIB channel is read to measure and record a thermal bond operating temperature. Then the thermal bond operating temperature is compared with an identified threshold temperature for the processor module as indicated in a decision block 506. For the QCM, as indicated in a block 508 a particular pair GPIB channels are read to measure and record the two thermal bond operating temperatures. Then each thermal bond operating temperature is compared with an identified threshold temperature for the processor module as indicated in a decision block 510. A pass is returned as indicated in a block 512 when the thermal bond operating temperature is less than the identified threshold temperature. Responsive to the thermal bond operating temperature being greater than the identified threshold temperature, then a fail is returned as indicated in a block 514.

Figure 6A:
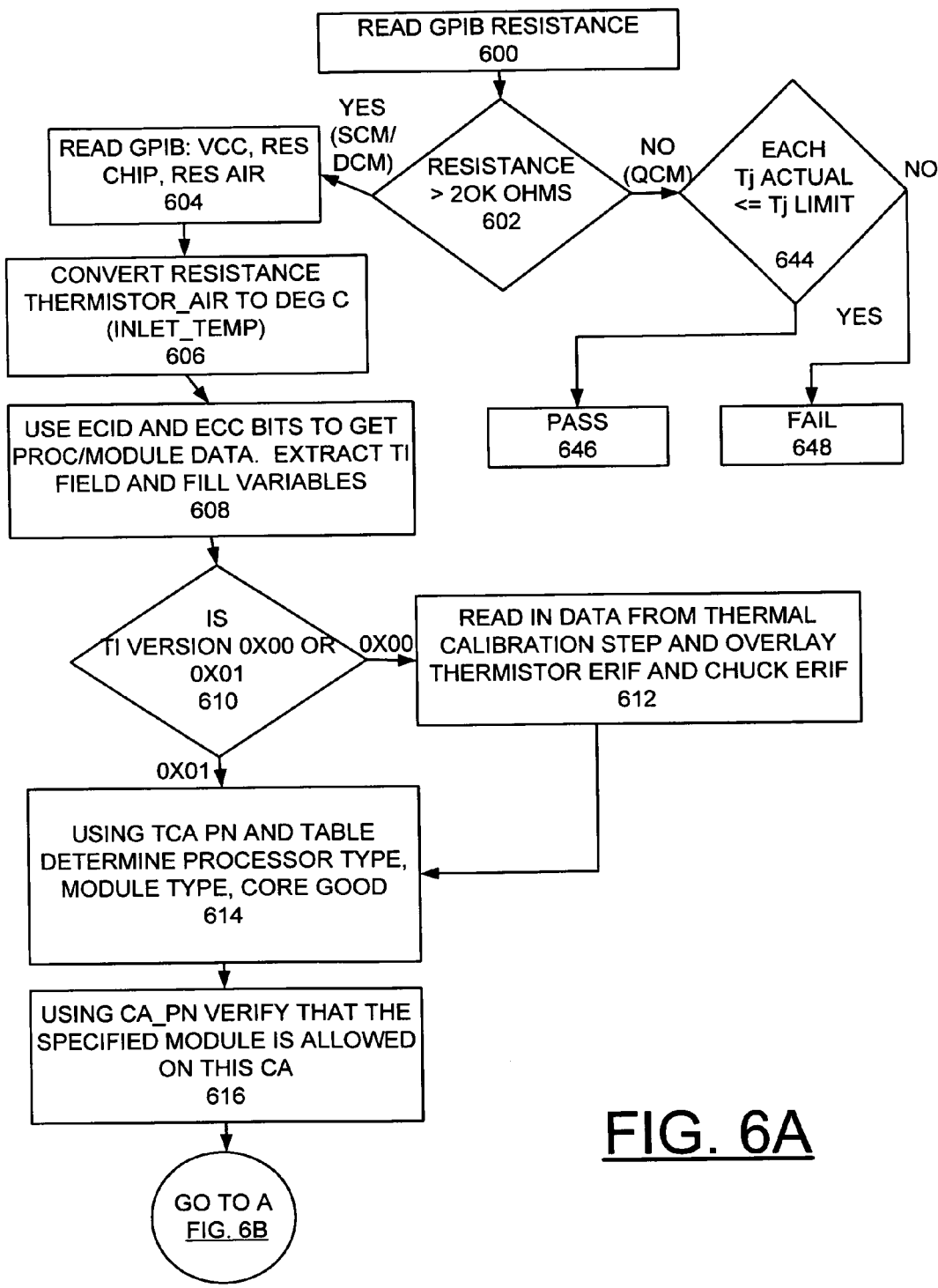
Figure 6B:
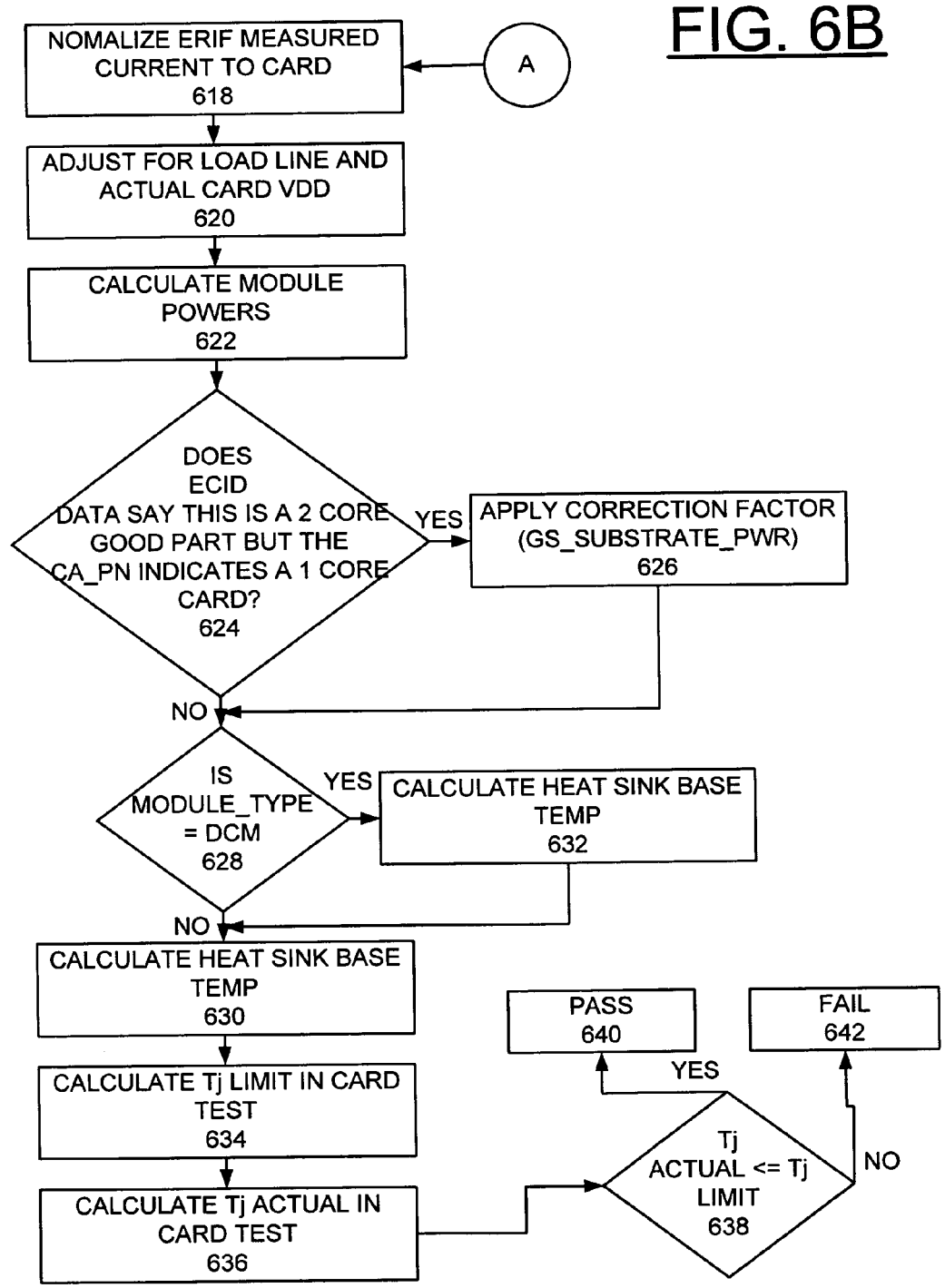

Referring to FIGS. 6A and 6B, there is shown an exemplary gap check. First the particular GPIB channel is read to check a resistance as indicated in a block 600. The resistance is compared with a predetermined value, such as 20K ohms as indicated in a decision block 602 to identify the module type. Then for the SCM or DCM, the sequential steps proceed with reading predefined measured values including the module supply voltage VDD, the on-die thermistor resistance value, and the intake air thermistor resistance value as indicated in a block 604. The air thermistor resistance value is converted to an inlet air temperature as indicated in a block 606. Then using the ECID and other identified ECC bits, predefined processor and module date is identified and predetermined variable are extracted and stored as indicated in a block 608. Predefined constants for specific printed circuit board processor module assembly are automatically selected at runtime that are used to verify that the correct processor module is attached to the printed circuit card and that the thermal gap is correct. Next a processor module version is identified as indicated in a decision block 610. If needed for the identified processor module version, data is read from the thermal calibration step and used to overlay thermistor data as indicated in a block 612. Then using particular part number data, a processor type, module type and core good, such as 1 core or 2 core good chips, are determined as indicated in a block 614. Next using particular part number data, then the specified module is verified to be allowed on the card as indicated in a block 616. Then the exemplary steps continue following entry point A in FIG. 6B.

Referring to FIG. 6B, next the ERIF measure current to the card is normalized as indicated in a block 618. Then adjustment is made for the load line and actual card voltage VDD as indicated in a block 620. Next module powers are calculated as indicated in a block 622. Next ECID data is compared with the card part number data as indicated in a decision block 624. A correction factor is applied if needed as indicated in a block 626. Then checking for a module type of DCM is provided as indicated in a decision block 628. Responsive to the identified module type, the heat sink base temperature is calculated as indicated in one of block 630 and block 632. Then the thermal gap temperature limit (Tj LIMIT) in the card is calculated as indicated in a block 634. The actual thermal gap temperature (Tj ACTUAL) in the card is calculated as indicated in a block 636. The identified gap temperature Tj ACTUAL is compared with the identified threshold temperature limit Tj LIMIT as indicated in a decision block 638. A pass is returned when each actual gap temperature Tj ACTUAL is less than or equal to the identified threshold temperature Tj LIMIT as indicated in a block 640. If the actual gap temperature Tj ACTUAL is greater than the identified threshold temperature Tj LIMIT, then a fail is returned as indicated in a block 642.

Referring again to FIG. 6A for a QCM all the above described calculations are done twice with some slight variations, then each identified gap temperature is compared with the identified threshold temperature limit as indicated in a decision block 644. A pass is returned when each actual gap temperature is less than or equal to the identified threshold temperature as indicated in a block 646. If the actual gap temperature is greater than the identified threshold temperature, then a fail is returned as indicated in a block 648.

Figure 7:
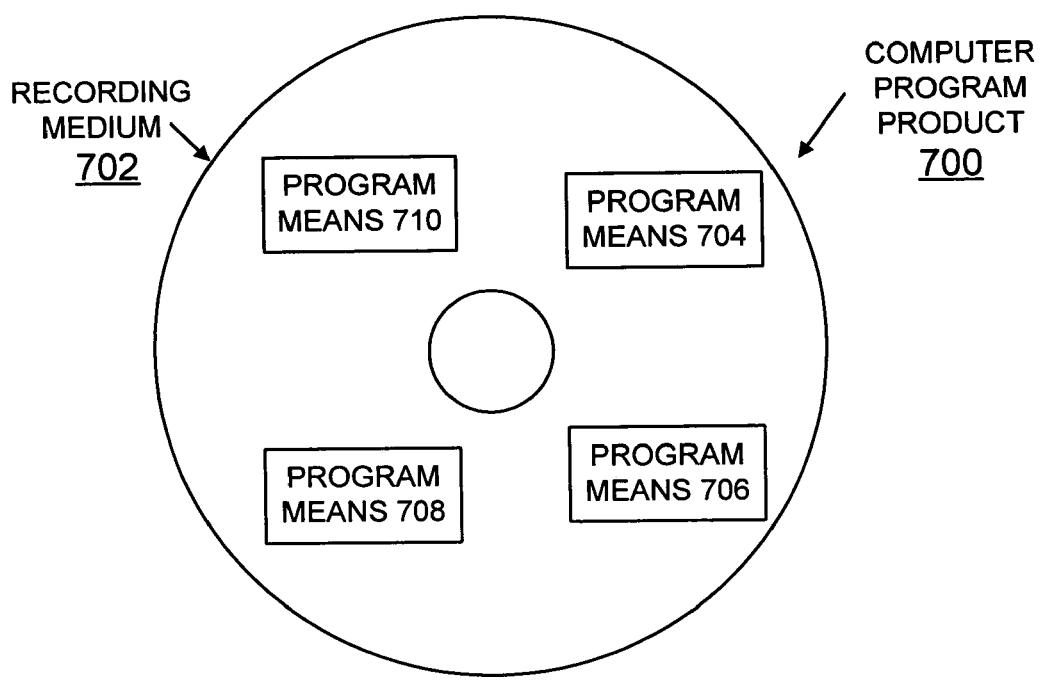
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing thermal integrity screening of the preferred embodiment in the system 100 of FIG. 1.

A sequence of program instructions or a logical assembly of one or more interrelated modules defined by the recorded program means 704, 706, 708, 710, direct the computer system 100 for implementing thermal integrity screening of the preferred embodiment.

While the present invention has been described with reference to the details of the embodiments of the invention shown in the drawing, these details are not intended to limit the scope of the invention as claimed in the appended claims.

What is claimed is:

1. A method for implementing thermal integrity screening for a processor module comprising:
   obtaining and processing predefined processor module temperature data;
   performing an initial thermal calibration to record a predefined processor resistance with no power applied to the processor module;
   performing a limit check at power up to detect a thermal bond operating temperature;
   comparing said thermal bond operating temperature with an identified threshold temperature for the processor module;
   responsive to an identified thermal bond operating temperature greater than the identified threshold temperature, powering down and failing the processor module; and identifying parametric data for the processor; and performing a gap check using said processed module temperature data and said identified parametric data for the processor to identify a thermal gap.

2. A method for implementing thermal integrity screening as recited in claim 1 wherein identifying parametric data for the processor includes identifying an electronic chip identification (ECID) for the processor for obtaining the parametric data for the processor.

3. A method for implementing thermal integrity screening as recited in claim 1 wherein performing said gap check includes verifying a correct processor module is attached to a printed circuit card.

4. A method for implementing thermal integrity screening as recited in claim 1 wherein obtaining and processing predefined processor module temperature data includes measuring an on chip temperature.

5. A method for implementing thermal integrity screening as recited in claim 4 includes providing a selected one of an on-die thermistor or thermal diode on a processor chip die.

6. A method for implementing thermal integrity screening as recited in claim 4 includes measuring intake air temperature.

7. A method for implementing thermal integrity screening as recited in claim 1 includes measuring a module supply voltage.

8. A method for implementing thermal integrity screening for a processor module comprising:
   obtaining and processing predefined processor module temperature data;
   performing an initial thermal calibration to record a predefined processor resistance with no power applied to the processor module;
   performing a limit check at power up to detect a thermal bond operating temperature;

comparing said thermal bond operating temperature with an identified threshold temperature for the processor module;

responsive to an identified thermal bond operating temperature greater than the identified threshold temperature, powering down and failing the processor module; and automatically selecting predefined constants for an identified specific circuit board processor module assembly; and performing a gap check using said selected predefined constants and said processed module temperature data.

9. A computer program product embodied on a computer-readable medium for implementing thermal integrity screening of a processor module system under test with a computer test system, said computer program product including instructions executed by the computer test system to cause the computer system to perform the steps of:

obtaining and processing predefined processor module temperature data;

performing an initial thermal calibration to record a predefined processor resistance with no power applied to the processor module;

performing a limit check at power up to detect a thermal bond operating temperature;

comparing said thermal bond operating temperature with an identified threshold temperature for the processor module;

responsive to an identified thermal bond operating temperature greater than the identified threshold temperature, powering down and failing the processor module; and identifying parametric data for the processor; and performing a gap check using said processed module temperature data and said identified parametric data for the processor to determine that the thermal gap is correct.

10. A computer program product for implementing thermal integrity screening as recited in claim 9 wherein identifying parametric data for the processor includes identifying an electronic chip identification (ECID) for the processor for obtaining parametric data for the processor.

11. A computer program product for implementing thermal integrity screening as recited in claim 9 wherein performing said gap check includes verifying a correct processor module is attached to a printed circuit card.

12. A computer program product for implementing thermal integrity screening as recited in claim 9 wherein obtaining and processing predefined processor module temperature data includes measuring an on chip temperature.

13. A computer program product for implementing thermal integrity screening as recited in claim 12 includes measuring intake air temperature.

14. Apparatus for implementing thermal integrity screening for a processor module comprising:

a data acquisition unit coupled to the processor module for obtaining predefined processor module data;

a thermal screening test program stored on a computer-readable medium for receiving and processing said predefined processor module data; for performing an initial thermal calibration to record a predefined processor resistance with no power applied to the processor module; for performing a limit check at power up to detect a thermal bond operating temperature and comparing said thermal bond operating temperature with an identified threshold temperature for the processor module; and responsive to an identified thermal bond operating temperature greater than the identified threshold temperature, for powering down and failing the processor module; and said thermal screening test program further identifies parametric data for the processor; and performs a gap check using said processed module data and said identified parametric data for the processor to identify a thermal gap.

15. Apparatus for implementing thermal integrity screening for a processor module as recited in claim 14 wherein said data acquisition unit is coupled to an intake air temperature sensor disposed in an incoming cooling air path to the processor module for measuring intake air temperature and an on-die thermal sensor for measuring an on chip temperature.

16. Apparatus for implementing thermal integrity screening for a processor module as recited in claim 14 wherein said thermal screening test program further identifies electronic chip identification (ECID) for the processor and obtains predefined parametric data for the processor.

* * * * *